United States Patent [19]

Vanderloop

[11] Patent Number: 4,784,250

[45] Date of Patent: Nov. 15, 1988

[54] SILO HAVING DOUBLE CHUTE ADAPTATION

[75] Inventor: James Vanderloop, Brillion, Wis.

[73] Assignee: Forager Silo Systems, Inc., Kaukauna, Wis.

[21] Appl. No.: 714,471

[22] Filed: Mar. 21, 1985

[51] Int. Cl.⁴ ............................................. B65G 11/20
[52] U.S. Cl. ........................................................ 193/34
[58] Field of Search ........................ 193/14, 29, 33, 34, 193/15, 4; 52/195, 196

[56] References Cited

U.S. PATENT DOCUMENTS

| 3,709,345 | 1/1973 | Price | 52/196 X |
| 3,797,625 | 3/1974 | Price | 193/34 |
| 3,931,877 | 1/1976 | Albaugh | 193/34 X |
| 4,339,024 | 7/1982 | Wollin | 193/34 |
| 4,416,362 | 11/1983 | Kilts et al. | 193/34 X |

FOREIGN PATENT DOCUMENTS 623437  5/1949  United Kingdom ................... 193/33

Primary Examiner—Andres Kashnikow
Assistant Examiner—Mary Beth O. Jones
Attorney, Agent, or Firm—Nicholas A. Kees

[57] ABSTRACT

A silo having a conventional tubular construction including a plurality of openings in one sidewall thereof and covered by a U-shaped housing to form an access chute. Attached to the outside of this U-shaped housing is a second housing to form a discharge chute between the outside of the U-shaped housing and the inside of the second housing. Side openings are formed in the side of the U-shaped housing facing the discharge chute. A funnel is provided to receive the silage from the conventional silo unloader disposed within the silo, and direct it from the access chute, where it is propelled by the silo unloader, into the discharge chute, where it can fall to the bottom of the silo without silage buildup in the access chute. Doors are provided over the side openings which are biased toward the closed position and automatically forced and held open upon insertion of the funnel in the appropriate side openings. In one embodiment the second housing has a reverse J-shape and is placed alongside the first, and in that case the silo wall also encloses part of the discharge chute. In another embodiment the second housing is U-shaped and is attached outside the first chute on the side opposite the silo.

4 Claims, 4 Drawing Sheets

SILO HAVING DOUBLE CHUTE ADAPTATION

BACKGROUND OF THE INVENTION

This invention relates to silos having chutes for discharging the silage stored therein, and in particular a silo having a second chute placed adjacent to the conventional discharge and access chute, into which the silage is funneled.

Conventionally, silos are vertical cylindrical shaped storage units of cattle feed, often called silage. One portion of the outside wall generally has a series of openings arranged vertically and covered by doors, which in turn are covered by a chute. This chute is conventionally used for access to the interior of the silo as well as for discharging the silage therefrom. The problem with using the chute for both purposes is that the discharge of silage causes a buildup of silage and dirt in the chute, with the ladder rungs disposed therein becoming sticky and gummy in hot weather, and frozen and slippery when cold. These conditions definitely make the use of the chute for access purposes objectionable. They can even make it difficult and dangerous to use.

To solve the problem of using the same chute for discharge and access, various prior inventions have attempted to divide the chute into a number of compartments. For instance, Price, U.S. Pat. No. 3,709,345 shows a silo chute divided into an access passage and a discharge passage. This results, assuming no special dimensions since none are disclosed therein, in a smaller-than-normal access passage or a larger-than-normal silo chute. Similarly, Price, U.S. Pat. No. 3,797,625 shows a separate discharge tube located within the access passage of the chute. Here again the access area of the chute is reduced by the addition of this discharge tube, unless the overall size of the chute is increased to a size larger than standard.

This invention relates to improvements over the inventions described above and to solutions to the problems raised thereby.

SUMMARY OF THE INVENTION

The invention includes an additional chute added to the outside of the existing chute of a conventional silo, adjacent to the existing chute. A plurality of vertically aligned openings are formed in the side of the existing chute facing the added chute. These openings are covered by openable doors which are normally in a closed position. A funnel is provided for directing the silage from the existing chute, through one of the vertically aligned openings, into the added chute where it can fall to the bottom of the silo without causing any buildup of silage in the access area of the original chute. In one embodiment the added chute is placed alongside the existing chute, while in another embodiment the added chute is placed outside the existing chute, that is, on the side of the existing chute opposite the silo.

It is an object of the invention, then, to provide a second chute, attached to the existing chute of a silo, for use as a discharge chute so as to keep the existing chute clean and available for safe and desirable access.

Another object of the invention is to provide a silo having two chutes, one for access and one for discharge of silage, and means for connecting the two chutes in communicating relation.

A still further object of the invention is to provide a funnel for directing the silage from the access passage in the existing chute to the discharge passage in the added chute.

Other objects and advantages of the invention will become apparent hereinafter.

DESCRIPTION OF THE PREFERRED EMBODIMENT

Figure 1:
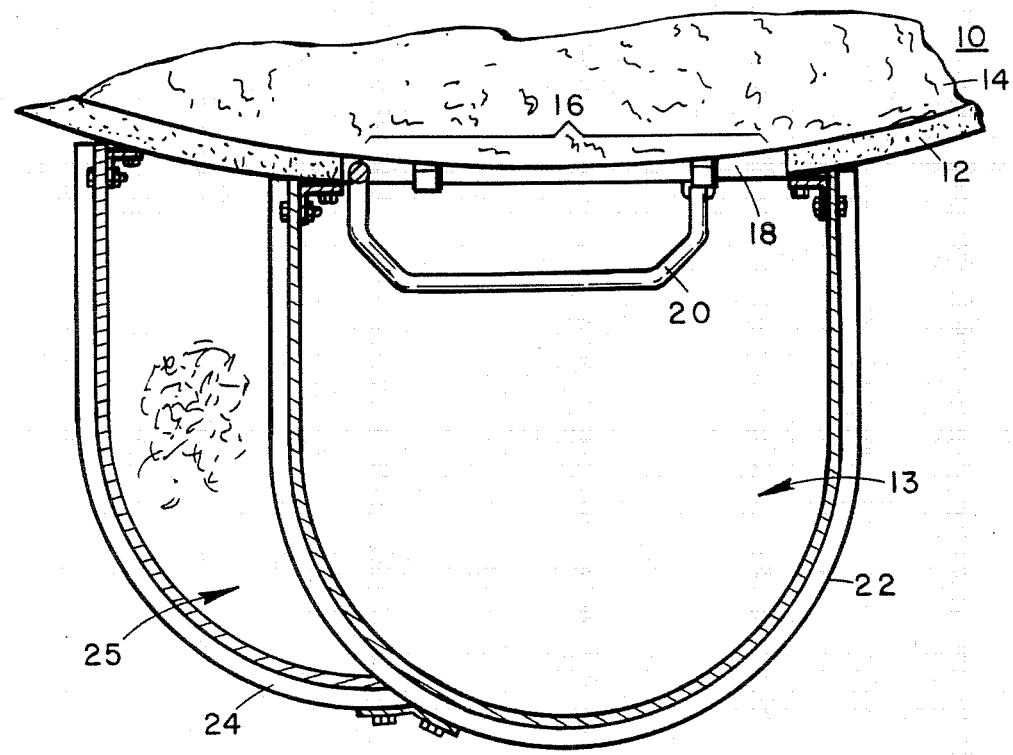
FIG. 1 is a top sectional view of one embodiment of the invention, taken along line 1—1 of FIG. 2, showing the existing chute and the added chute.
Figure 2:
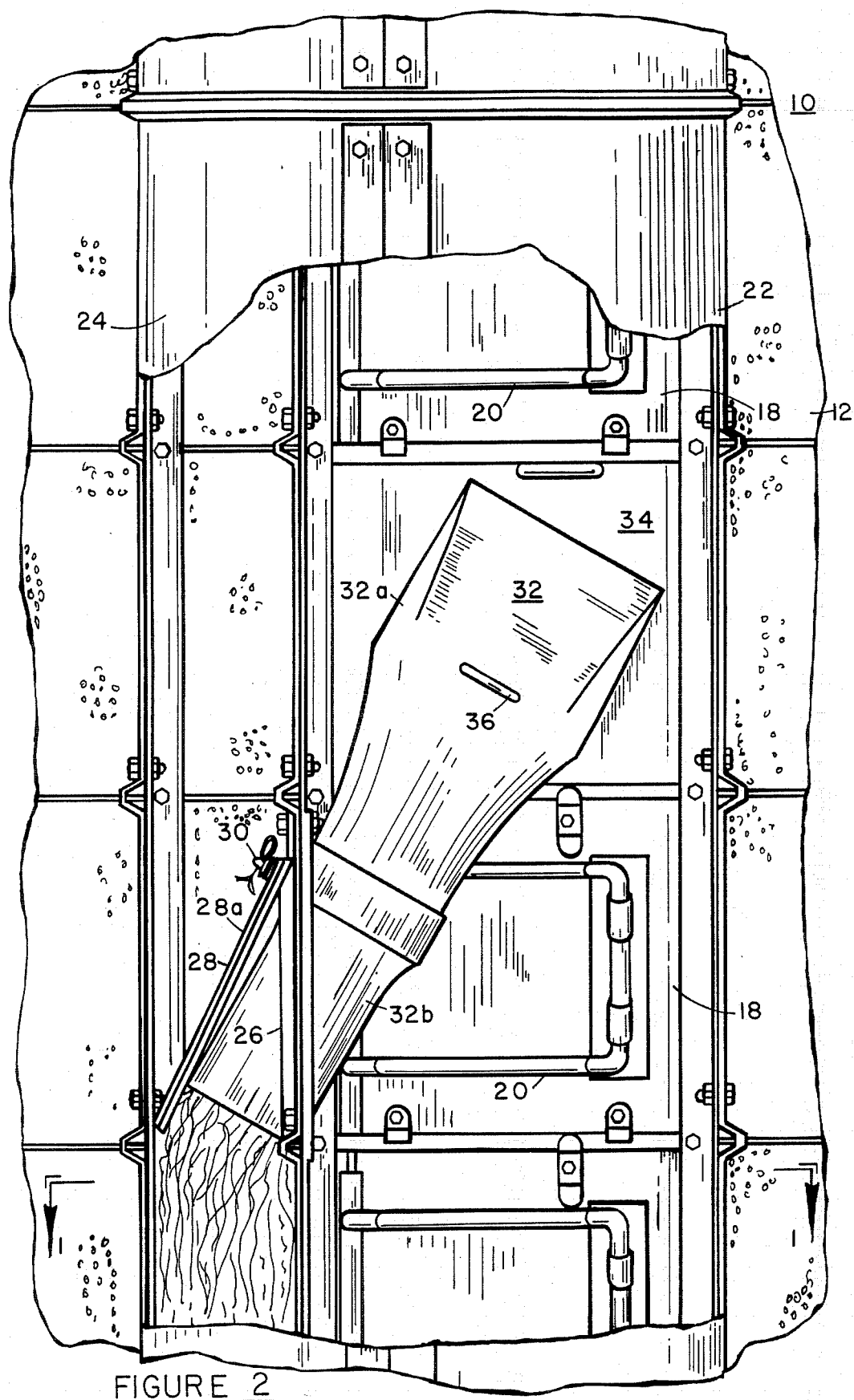
FIG. 2 is a front view, partially in section, of the embodiment shown in FIG. 1.

Referring now to FIG. 1, a conventional silo 10 is there shown, including a conventional outer wall 12. Silage 14 is contained within silo 10. As is conventional, an opening 16 is formed in a portion of silo wall 12 so as to allow the silage 14 to be removed therefrom. As can be seen in FIG. 2, there are actually a plurality of openings 16 aligned vertically along the height of silo 10, so that the silage can be accessed and discharged at approximately the level where the top of the silage currently resides. As shown in FIGS. 1 and 2, each of these openings 16 is covered by an openable door 18. This door 18 commonly has protrusions 20 which are used as ladder rungs in order to climb up in solo 10 when necessary. Enclosing and covering door 18 and opening 16 is usually a U-shaped housing 22 which cooperates with outer wall 12 for form a chute 23, hereinafter called the "access chute" 23. Generally a silo unloader (not shown) is disposed inside silo 10 to propel the silage located therein outward into the access chute 23.

The invention includes a second housing 24 added to the outside of existing housing 22 for the entire length thereof, to form a second chute 25, hereinafter called the "discharge chute" 25. The discharge chute 25 may be substantially narrower than the access chute 23. In the embodiment shown in FIGS. 1, 2 and 3, housing 24 is mounted to one side of existing housing 22, and has the shape of a reversed J. It is attached in any suitable way to housing 22 and silo wall 12 so as to form the discharge chute 25. Preferably, the straight edge of housing 24 is bolted to wall 12 while the curved edge reaches just short of the center of housing 22 and is bolted there. Hence the width of discharge chute 25 is about one-third of the width of access chute 23. Further, the exterior of the combination of housing 22 and housing 24 as well as the cross-section of the combination is roughly a W-shape.

Figure 3:
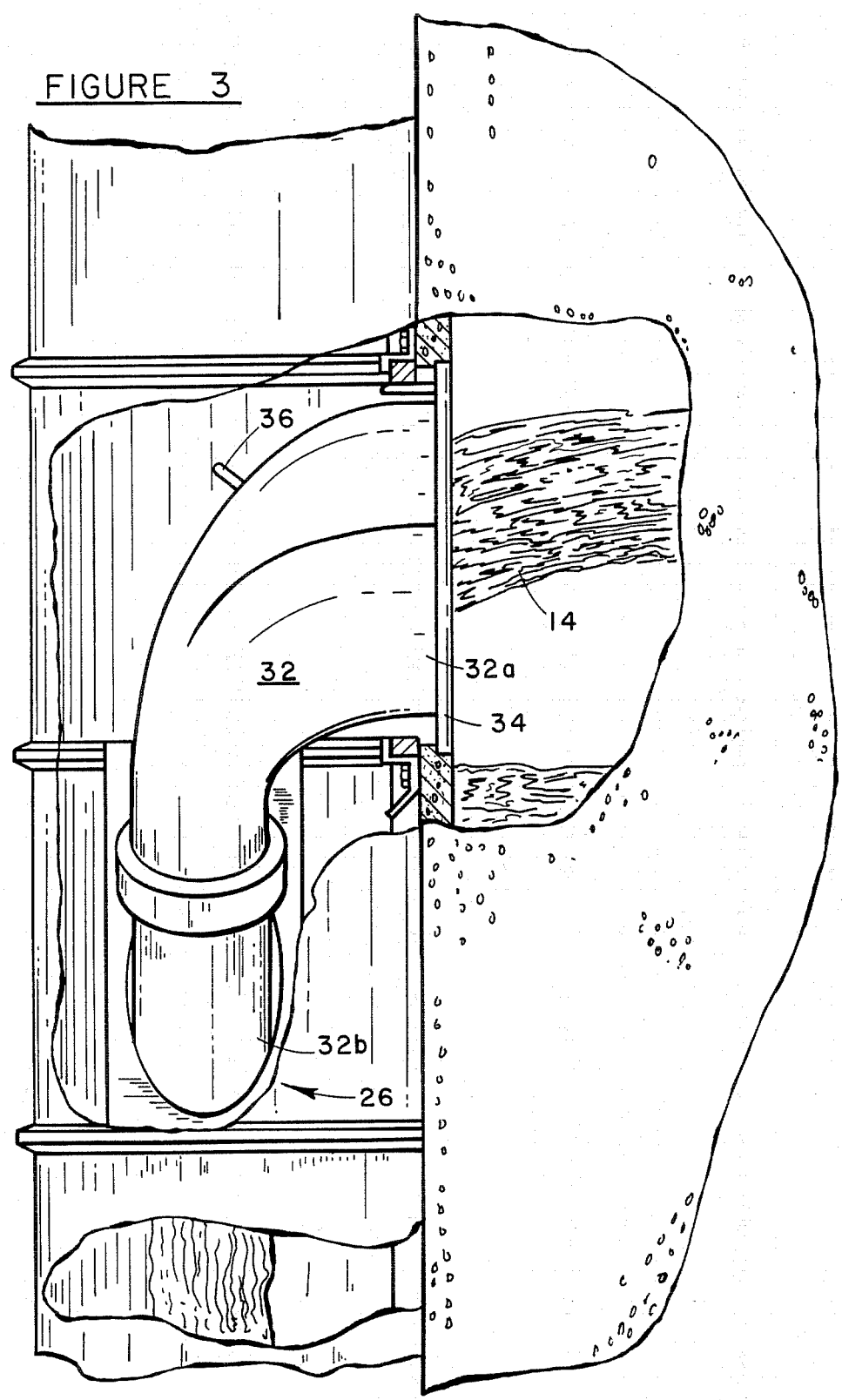
FIG. 3 is a side view, partially in section, of the embodiment shown in FIG. 1.
Figure 4:
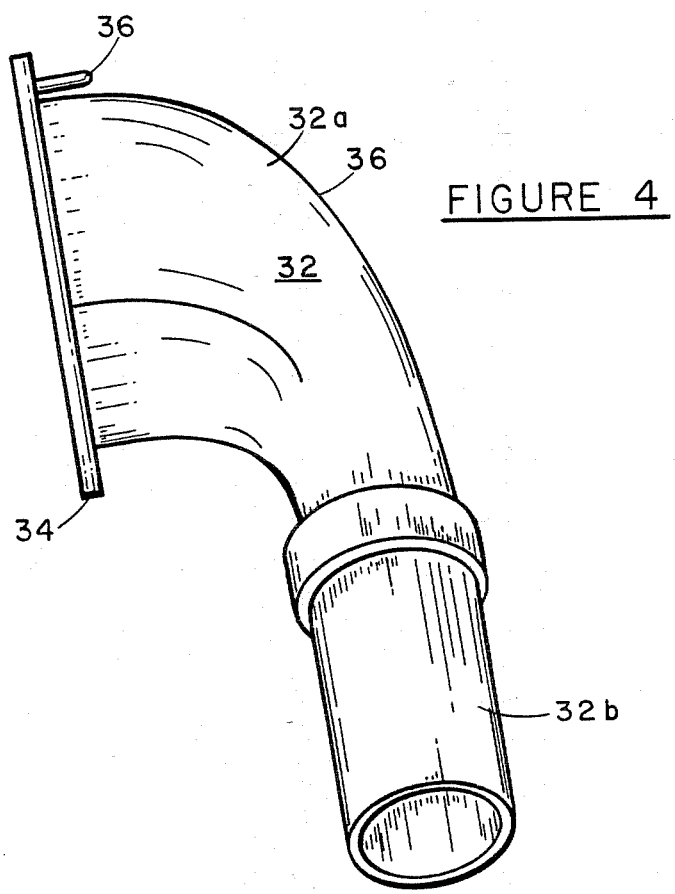
FIG. 4 is an isometric view of the funnel employed in the embodiment shown in FIG. 1.

As shown in FIG. 2, a plurality of side openings 26 are formed in the side of housing 22 on the side to which housing 24 is attached. Each of these openings 26 is covered by an openable side door 28, which is preferably hinged on the upper end 28a thereof. Also preferably, this door 28 is hinged using a spring means 30 so that door 28 automatically closes and is biased toward the closed position. A funnel 32 is then employed to receive silage 14 from the silo unloader (not shown) inside silo 10 and direct the silage 14 into discharge chute 25, where it can fall to the bottom of the silo without causing any silage buildup in access chute 23. As shown in FIGS. 2 and 3 and in isometric in FIG. 4, funnel 32 includes a large end 32a at its upper end for receiving silage 14. Funnel 32 then tapers smoothly to a smaller end 32b at its lower end. End 32b is sized in combination with opening 26 so as to fit snugly therein when inserted at an angle of between 25 and 45 degrees as shown in FIG. 2. As indicated in FIG. 3, opening 26 may be oblong in shape to acommodate this angled insertion.

Attached to or formed integrally with large end 32a of funnel 32 is a mounting plate 34. Plate 34 is constructed so as to mount to silo opening 16 after opening the silo door 18 located at the proper level. Plate 34 is mounted into opening 16 by inserting the entire large end 32a of funnel 32 into the opening, inserting small end 32b of the funnel 32 into the applicable side opening 26, and drawing plate 34 outward until it contacts opening 16, where it stops. Plate 34 is preferably rectangular in shape, similar to but just larger than opening 16, so that it can be inserted at an angle then "hooked" in the opening. To make funnel 32 more wieldy, a handle 36 may be provided, attached to any suitable part of funnel 32, such as the back of large end 32a as shown in the figures.

In operation, funnel 32 is carried up the access chute 23 by the human operator (not shown). When the operator reaches the current level of the silage 14 in the silo 10, he opens the lowest silo door 18 above the level of the silage 14. This should align with the outlet of the silo unloader (not shown) inside the silo. The operator then inserts plate 34 and large end 32a into silo opening 16. Next, the operator inserts small end 32b into side opening 26, pushing side door 28 open in the process. Finally the operator lowers funnel 32 until it stops either because lower end 32b contacts the edge of opening 26, or plate 34 contacts the edges of silo opening 16. When the silo unloader then begins to operate the silage is directed from access chute 23 downward and into discharge chute 25 by funnel 32.

Figure 5:
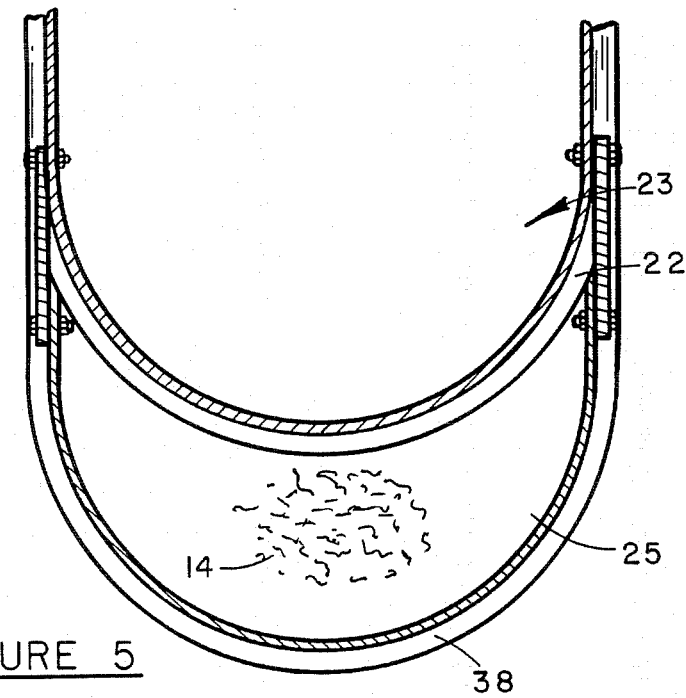
FIG. 5 is a top sectional view, similar to FIG. 1, showing a second embodiment of the invention.

Referring now to FIG. 5, another embodiment of the invention is shown wherein a second housing 38 is mounted outside the original housing 22, that is, opposite the silo opening 16, instead of alongside as shown in the other drawing figures. This second housing 38 is U-shaped, similar to housing 22 itself, not J-shaped as was housing 24. Similar to housing 24, however, housing 38 still forms a discharge chute 25 outside of access chute 23. The sileage is then discharged through access chute 23 and into discharge chute 25, as described above.

While the apparatus hereinbefore described is effectively adapted to fulfill the aforesaid objects, it is to be understood that the invention is not intended to be confined to the particular preferred embodiment of double chute silo adaptation herein set forth. Rather, the invention is to be taken as including various equivalents without departing from the scope of the appended claims.

What is claimed is:

1. In a silo having a tubular configuration defined by upright side walls for holding silage therein, and from which said silage is discharged, including a plurality of vertically spaced silo door openings in one side wall portion thereof, said door openings being in vertical alignment with each other, through which said silage may be discharged, an openable silo door covering each of said silo door openings, and an elongated U-shaped member covering said silo door openings and silo doors and cooperating with the silo side wall to form an access chute, an apparatus for adapting said silo to provide a discharge chute in addition to said access chute, said apparatus comprising:

a housing, one edge of which is attached to the outside of said U-shaped member along the entire length thereof and the opposite edge of which is attached to the outside of the silo along the majority of the length thereof to thus enclose said discharge chute;

a plurality of vertically aligned side openings formed in the side of said U-shaped member facing said housing; and a funnel, one end of which is removably engageable with any of said silo door openings, and the other end of which is removably engageable with a corresponding one of said side openings, for directing the silage as it is discharged from the silo through said corresponding one of said side openings.

2. A silo as recited in claim 1 further comprising side doors for closing said side openings formed in the side of said U-shaped housing.

3. A silo as recited in claim 2 further comprising biasing means for holding said side doors in a normally closed position over said side openings.

4. A silo as recited in claim 1 further including a mounting plate connected to the end of said funnel engageable with said silo door openings for mounting said funnel in the appropriate one of said silo door openings.

* * * * *